Sheet 1. 3 Sheets.

G. W. Chandler.
Loom for Weaving Palm-Leaf &c.
Nº 71852. Patented Dec. 10, 1867.

Witnesses:
Thos. H. Dodge
D. L. Miller

Inventor,
Geo. W. Chandler

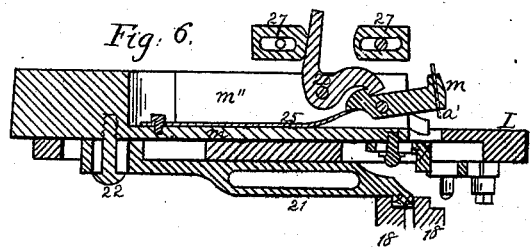
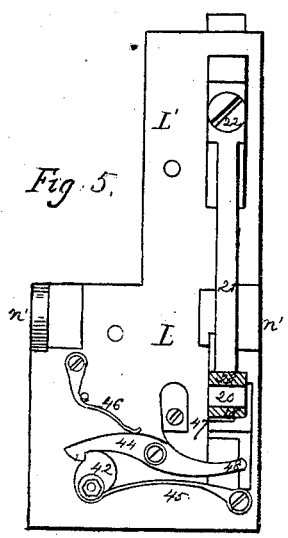
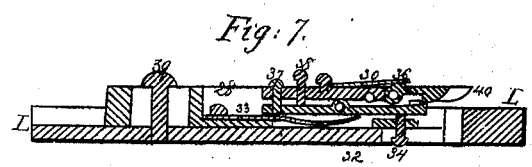
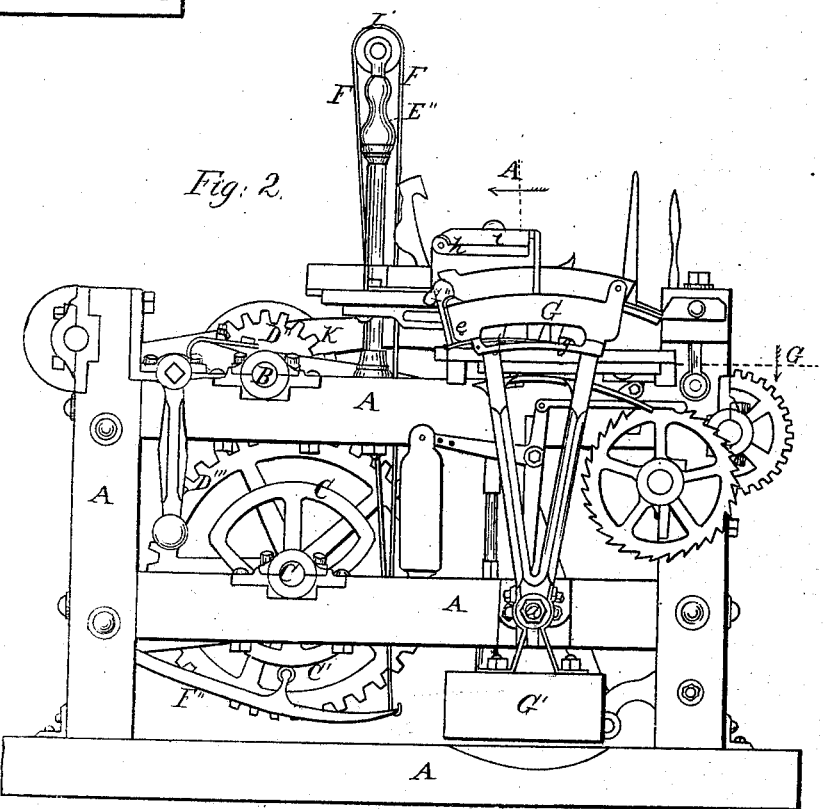

G. W. Chandler.
Loom for Weaving Palm-Leaf &c.

N° 71852. Patented Dec. 10, 1867.

Witnesses:
Thos. H. Dodge
D. L. Miller

Inventor:
Geo. W. Chandler

United States Patent Office.

GEORGE W. CHANDLER, OF FITCHBURG, MASSACHUSETTS, ASSIGNOR TO HIMSELF AND LYSANDER F. THOMPSON, OF SAME PLACE.

Letters Patent No. 71,852, dated December 10, 1867.

IMPROVEMENT IN LOOM FOR WEAVING PALM-LEAF, &c.

The Schedule referred to in these Letters Patent and making part of the same.

KNOW ALL MEN BY THESE PRESENTS:

That I, GEORGE W. CHANDLER, of Fitchburg, in the county of Worcester, and Commonwealth of Massachusetts, have invented certain new and useful Improvements in Looms for Weaving Palm-Leaf, Hair, Rattan, &c.; and I do hereby declare that the following is a full, clear, and exact description of the same, reference being had to the accompanying drawings, forming a part of this specification, in which—

Figure 3 represents a section on line A B, through the feeding-arm and other parts of the loom, when the arm is thrown forward to seize a piece of palm-leaf or other material.

Figure 4 represents a top view of the device employed to hold and separate the material.

Figure 1:
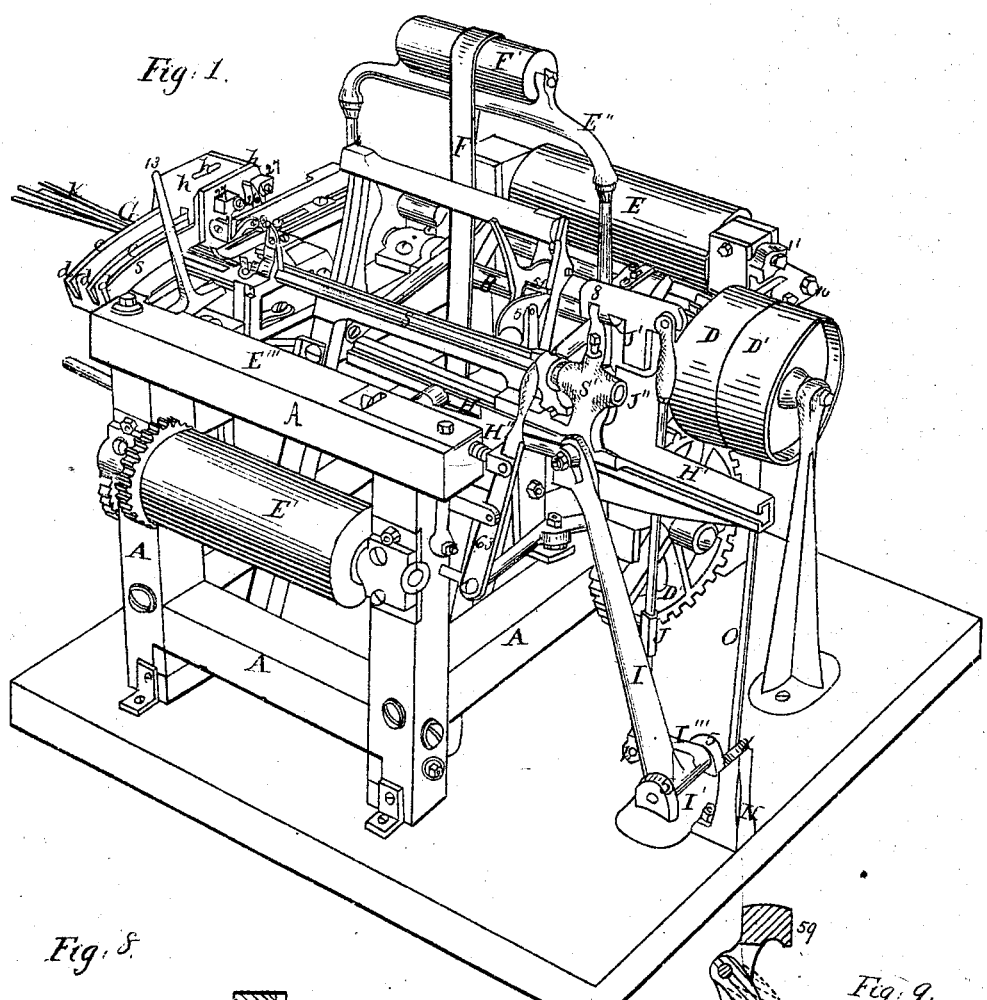
Figure 1 represents a perspective view of my improved loom.
Figure 8:
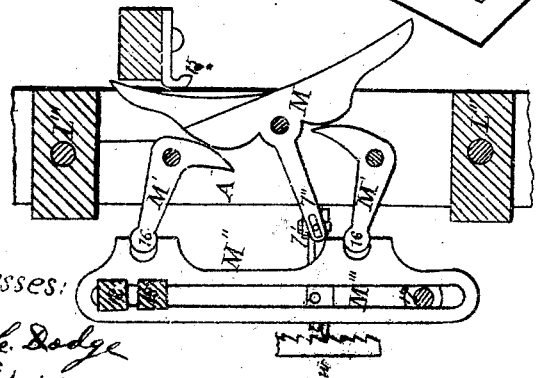
Figures 8 and 9 represent sections of detached parts, as will hereafter be explained.
Figure 9:
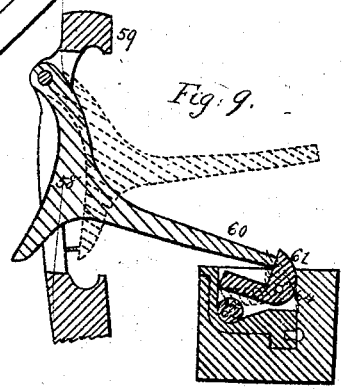

The parts shown in figs. 4, 5, 6, 7, 8, and 9, are represented upon an enlarged scale.

To enable those skilled in the art to which my invention belongs to make and use the same, I will proceed to describe it more in detail.

In the drawings, the parts marked A constitute the main frame, which may be constructed of any desired material, and may be varied in form to suit the wishes and tastes of the constructor. Upon frame A are supported two shafts, B and C. The former is provided with two cranks, to work the lay of the loom, and a tight pulley, D, and a loose pulley, D'. A gear-wheel, D'', is also arranged upon shaft B, to mesh into and drive the gear D''' upon shaft C, upon which are arranged the harness-cams C' C', for giving the proper motion to the treadles and harness-frames, in the usual and well-known manner. E is the warp-beam, and E' is the cloth-beam. The latter has combined with it the usual mechanism for taking up the cloth as fast as it is woven, while the former may have combined with it any of the well-known devices for securing a uniform delivery. E'' is the frame which supports the harness-frames, and E''' is the breast or cloth-beam. Straps F F are attached to the roll F' and the treadles F'', to illustrate the relative positions of the harness-frames when the loom is in operation. Upon one side of the loom is arranged the palm-leaf, or other material-holder, G. This holder is supported upon an adjustable journal, a, and has a weight, G', attached to its lower end, as fully shown in the drawings.

Figure 2:
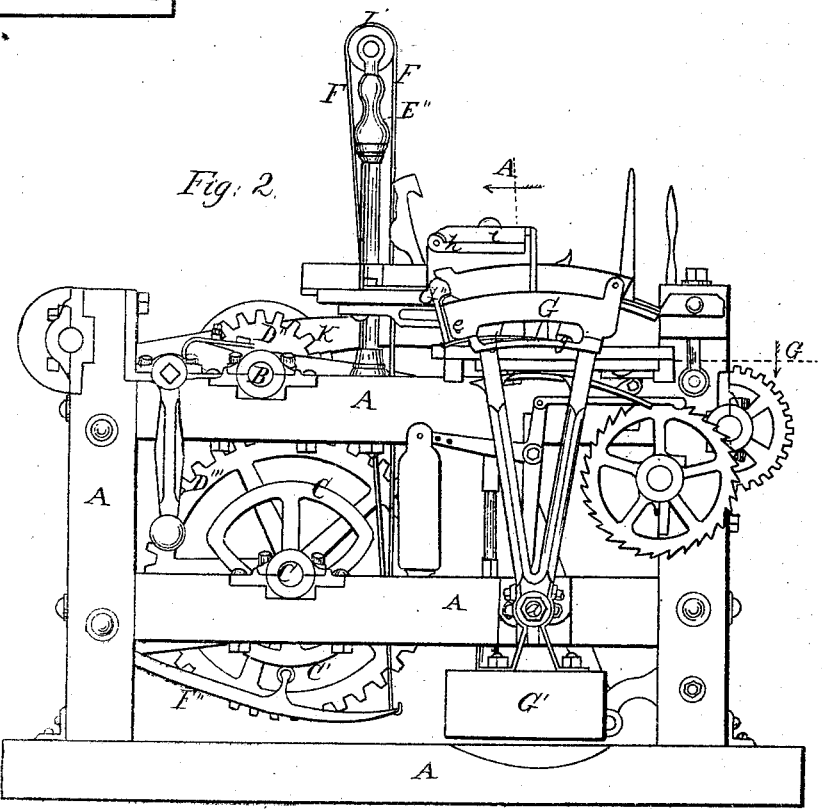
Figure 2 represents a side view of the same.

The upper part of the holder G is formed, in this instance, with three ribs, b b b, between which the hinged fingers c c work. Fingers c c are hinged between ears d d d, which project up from the front of the top of the holder G, and are supported at their front ends, which are notched out, by the finger-holding piece G'', which is hinged at e, to the back of the upper part of the holder G, and is held up in place, as shown in fig. 2, by means of the spring f, fastened at g, so as to play in a recess or slot formed in the holder G. The finger-holding piece G'' may be made with projections c' c', to fit in between the ends of the ribs b b b, to give additional support to the ends of the fingers c c. A plate, h, projects out from the side of the loom, and upon the top of this plate is hinged a grooved flap, i, and in this grooved flap is fastened the step or guard h', provided with fingers, which project down between the fingers c c and ribs b b b, when the hinged flap i is turned down, as shown in the drawings. The object of this holder is to retain the pieces of palm-leaf in proper position, and present them at the proper time to the jaws 1 2, of the feed-rod S, the rear end of which is held in the arm S' by means of a set-screw, j.

The arm S' is connected to the slide-bar H, the wide square part of which works in the stationary grooved guide-piece H', which is fastened to the loom-frame upon the opposite side from the palm-leaf holder. From the front side of the slide H projects a hub, 3, which supports a stud, upon which the front end of the connecting-rod H'' is hinged, the rear of said connecting-rod being hinged to the top of the rocking-lever I, which is journalled between the ears 5 5 of the stand-piece I'.

The short arm I'' of lever I is fitted to receive the adjustable grooved piece or link I''', in the front end of which is the wrist-pin 6, to which the lower end of the connecting-rod J is hinged, the upper end of said rod being hinged to the projection 7, on the slide-piece J', which is fitted to work up and down in a square sleeve, J''. The projection 8 of the slide-piece J' is connected to the front end of lever K by a hinged connection, 9. Lever K is hinged at its rear end to an adjustable piece, 10, fastened in the grooved projection 11 on the loom-post or frame. From the outer side of lever K projects a stud or pin, which fits into a cam-groove in the inside of the tight pulley D. The cam-groove in the pulley D is made of such shape as to give the desired motions to the feed-rod S, to draw in the material, and also the proper rests to allow the lay to beat up the material in the usual manner of weaving cloth.

The operation of holding and feeding the palm-leaf or other material into the proper position to be woven or beat up into cloth, is as follows: The flap $i$ is turned up, and the fingers $c\,c$ turned back. The knife 12 is also elevated by means of handle 13, which is pulled back over the breast-beam. The pieces of material, say palm-leaf, are now laid upon the ribs $b\,b\,b$, with their inner ends projecting in over the stationary knife 14, against which the hinged knife 12 cuts, shear fashion, when it is depressed, by means of handle 13. After a suitable number of pieces, $k$, of palm-leaf have been placed upon the ribs $b$, with their inner ends projecting under knife 12, fingers $c\,c$ are depressed until their ends strike the projections $c'\,c'$ upon the inside of the hinged catch-piece G'', which has been forced back by the downward motion of the fingers $c\,c$. As soon as the ends of the fingers $c\,c$ strike the projections $c'\,c'$, on the piece G'', the latter is forced forward by spring $f$ into the notched ends of the fingers $c\,c$, and thereby holds the fingers in their depressed position, as indicated in the drawings.

By reference to fig. 3 of the accompanying drawings, it will be seen that the strips or pieces, $k$, of palm-leaf are arranged or held down flatwise between the fingers $c\,c$ and ribs $b\,b\,b$. The pieces of palm-leaf are caused to assume this position by reason of the action of the fingers which press down upon the edges of the strips, and thus cause them to turn over upon their sides. Again, as the fingers pass down, a little below the tops of the ribs $b$, the strips of palm-leaf are slightly bent or curved between the fingers and ribs, as indicated in the drawings, whereby a sufficient amount of friction is applied to the separate pieces, to prevent their being displaced or imperfectly drawn from the holder by the jaws of the feed-arm S. After the fingers $c\,c$ have been depressed upon the strips of palm-leaf, as above described, the handle 13, of knife 12, is forced back, thereby depressing knife 12 down past the stationary knife 14, by which operation the ends of the strips of palm-leaf are all cut off even, and left in proper position to be fed to the jaws of the feed-arm or rod S. As soon as the ends of the strips are cut off, the holder is allowed to swing back, so as to bring the strips up against the fingers of the guard-piece $h'$, which is turned down, as shown in the drawings, after fingers $c\,c$ have been pressed down upon the material, as before explained.

The weight G' is made adjustable, so that it can be moved to cause the holder to press the strips of palm-leaf or other material with more or less force against the fingers on the guard or stop-piece $h'$. The guard or stop-piece $h'$ has a slot, so that it can be adjusted, by means of the screw $h''$, to stop the pieces of palm-leaf at the proper position to be acted upon by the point or points of the hinged feed-finger $m$, which is hinged at $m'$ to the outer side of the rib $m''$, of the slide-piece $n$, which rests and slides upon the table L, which has two ears $n'\,n'$ upon its under side, by which it is hinged to the projections $n''\,n''$, upon the stationary bed-piece L'', fastened to the top of the loom-frame, so that by pulling back the catch $o$ table L can be turned up, together with the mechanism thereon, for the purpose of repairing or readjusting of the devices attached thereto.

The office of the finger $m$ is to catch, with its point or points $a'$, the end of one piece of palm-leaf at a time, and draw it back on a line with the jaws of the feed-arm S, as indicated in fig. 4 of the accompanying drawings, and the back-and-forth motion of the slide-piece $n$, to which it is hinged, is obtained as follows: To one leg of the lay is fastened the curved dog 15, which acts as the lay, plays back and forth alternately upon the arms of the curved lever M, which in turn acts alternately upon the curved levers M' M', thereby giving a reciprocating motion to the slotted piece M'', the rounded ends 16 16 of levers M' M' fitting into circular recesses in the piece M'', all as clearly indicated in the drawings. Levers M and M' M' and the slide M'' are all properly supported from the under side of the bed-piece L''. Bed-piece L'' has two legs or stands L''' L''', which rest upon the loom-frame A, and thus support the bed-piece above the frame to give room for the full operation of the levers M M' M' between the top of the frame and the bottom of the bed-piece. A stationary guide-bolt, 17, passes through slot M'''' into the bed-piece L'', the slide-piece M'' being supported at one end upon the head of the bolt, while the other end of the slide is supported by two double-shouldered dogs 18 18, which pass down through a slot in the bed-piece L'', the first shoulders resting and sliding upon the bed, while the second shoulders are screwed down upon the slide M'', by means of nuts 19, upon the ends of the bolts which pass down through the slot M'''' in the slide-piece.

Figure 6:
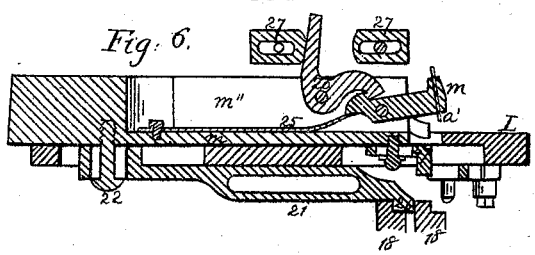
Figure 6 represents a section on line C D, fig. 4.

It will thus be seen that these double-shouldered bolts can be screwed fast to the slide-piece M'', while they can be moved with the slide-piece back and forth, the first shoulders of the bolt sliding upon the top of the bed L'', the length between the first and second shoulders being a little more than the thickness of the bed. The bolts 18 18 are set far enough apart to receive the projection 20, on the piece 21, which is fastened to the hinged finger-slide piece $n$ by means of a screw or bolt, 22, which passes through a slot in the rear end of the piece 21, the latter being made with a projection which passes through a slot in the rear end, L', of the table L, as indicated in fig. 6 of the accompanying drawings, whereby the piece 21 and slide $n$ can be securely fastened together, and yet be free to move back and forth as respects the table L'', the projection 23, on the rear end of piece 21, being a little longer than the thickness of table L, to prevent binding of the parts.

From the foregoing description it will be seen that by the simple movement of the lay, back and forth, the proper motion will be imparted to the slide $n$, to which the finger $m$ is hinged, and it only remains to explain the up-and-down motion of the finger, which is necessary in order to clear the point or points $a'$ from the material fed.

The rear end of finger $m$ is made with a notched projection, 24, which is pressed up by a spring, 25, while a curved and hooked lever, 26, is hinged just in rear of finger $m$, the upper end of lever 26 projecting up between the slotted ears 27 27, which are screwed to the inside of plate $h$, so that when finger $m$ has been drawn back far enough to draw the end of the palm-leaf back to the proper position, as seen in fig. 4, the upper end of lever 26 strikes against the back ear 27, thereby forcing the hooked end of the lever down upon the rear of finger $m$, and raising the front end and its point from the piece of palm-leaf. When slide $n$ moves forward again, finger $m$ is retained in the elevated position shown in fig. 6, until the upper end strikes against the front ear 27, when lever 26 is unhooked from the rear of finger $m$, and the point $a'$ of the latter is forced down, by the action of spring 25, upon the next piece of palm-leaf, which is drawn back, and the operation repeated, as above explained.

Figure 7:
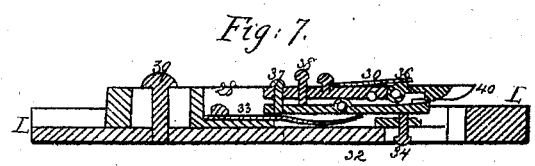
Figure 7 represents a section on line E F, fig. 4.

The final separating device will now be explained, reference being had more particularly to fig. 7, which represents a longitudinal central section of the device, a plan view of which is shown in fig. 4.

The front part of the block 28 is recessed or cut out to receive piece 29, which is hinged, at 30, to the sides of the block 28. The under side of the piece 29 is, in turn, fitted to receive the check-piece 31, which, in turn, is hinged to the sides of the piece 29 at the point 32. A spring, 33, is so arranged as to press up and keep the front end of the piece 29 down, so that the front end of the check-piece 31 will rest upon the point of the set-screw 34. A notched or hooked piece, 35, is hinged to the front of the piece 29, and is forced down upon the end of the check-piece 31 by a spring, 36. The front end of the piece 29 can be depressed or elevated relatively, as respects the front end of the check-piece 31, by means of screws 37 and 38, while the front end of the check-piece 31 can be adjusted up or down by the set-screw 34, which is screwed up through the bottom of the block 28, the latter being fastened, by screw 39, in a groove in table L.

To adjust the separating-device, last above described, for operation, set-screw 34 is turned up far enough to raise the front end of the check-piece 31, so that there will only be space enough between the top of the latter and the bottom of the stationary guard 40 to admit one piece of palm-leaf at a time. After this adjustment has been made, if two or more pieces of palm-leaf happen to be caught by the point of finger $m$, when they reach the end of check-piece 31 all but the top piece will be held back, while that will be drawn in under and past the point of the notched finger 35, which yields to let the end of the palm-leaf pass under, but falls down as soon as the latter has been drawn back of its lip, and prevents any lateral displacement of the palm-leaf, when the jaws of feed-arm or rod S move forward to seize it, and draw it forward between the warp-threads, to be beat up into cloth in the usual manner.

41 is a push-finger, the office of which is to push back the ends of all the pieces of palm-leaf but one at each throw of the feed-arm or rod. The stem of push-finger 41 extends through table L, and is made fast to the catch-piece 42, which is acted upon by spring 43 in such a manner that, when free from the catch-lever 44, the push-finger 41 will be turned forward directly in the path of the jaws of the feed-arm, so that, when they are moved forward into the position shown in figs. 1 and 2, they force the push-finger back, the point of which forces back the ends of all the pieces of palm-leaf but the one in line with the feed-jaws, which the latter seizes and draws into the web, as before explained.

Figure 5:
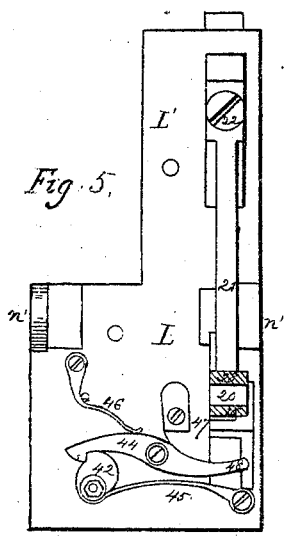
Figure 5 represents a bottom view of a part of the device shown in fig. 4.

When the push-finger 41 is forced back by the feed-jaws, the catch-piece 42, attached to its stem under the table L, is moved so far back as to be caught by the catch-lever 44, which is forced forward by the spring 46, (see fig. 5, which represents a bottom view of table L, and the parts connected therewith.) When, however, the slide-piece $n$ moves forward again to let the finger $m$ fall upon another piece of palm-leaf, a projection or piece, 47, (see figs. 5 and 6,) fastened to the under side of the front end of the slide $n$, strikes the rear end 48 of lever 44, and releases its front end from the catch-piece 42, when spring 43 forces the push-finger back into the path of the feed-jaws again, and the operation is repeated, as above described.

The upper part of the feed-arm S is grooved out, and a spring, 49, is fastened in said groove in such a position as to act upon the hinged jaw 1, to keep it down upon the stationary jaw 2.

The feed-jaws pass under a bridge-piece, 50, on the table L, and, in going under, the rear projection 51 of the hinged jaw comes in contact with the hinged dog 52, which causes the jaw to open and remain so until the dog 52 has been passed, when the jaw falls, or is forced down by spring 49, upon the end of a piece of palm-leaf, under which the stationary jaw has passed, the latter working in a recess cut in table L, so as to be below the lower side of the piece of palm-leaf which is to be seized between the jaws.

When the feed-arm S is withdrawn, the hinged dog 52 swings back, and lets the hinged jaw pass under without being opened; but, as soon as the jaws are clear of the dog, the latter is forced back by the bell-spring 53, fastened to the top of the bridge-piece 50. After the piece of palm-leaf has been drawn in far enough to be acted upon by the reed, the projection 51 of the hinged jaw is drawn under the inclined end of the dog 54, fastened in the guide-piece 55, through which the feed-arm S passes, which causes the jaw to open and release the piece of palm-leaf, which is then carried forward by the reed, and the harnesses are sprung to prepare the warp-threads for another piece of palm-leaf, which is drawn in at the proper time, as above explained.

For the purpose of stopping the loom when a piece of palm-leaf has been missed, or all the material has been drawn from the holder, a stand, 56, is fastened to the frame of the loom, upon which a pin, 57, works to keep the lower end of the stop-piece 58 elevated when the lay is back, the stop-piece 58 being hinged at its upper end in a slot in the frame 59, attached to the upper part of the lay. When, however, the lay moves forward to beat up the piece of palm-leaf, pin 57 moves down over the front of the guide-piece 56, and, if the piece of palm-leaf is in proper position, the lower end of the stop-piece 58 will strike against the piece of palm-leaf, and will be retained in the position shown in red lines, fig. 9, the piece of palm-leaf resting against the frame 59, (see red lines, fig. 9.) In case, however, the palm-leaf has been missed, or has not been drawn in by the jaws, then the stop-piece will swing down, and the long arm 60 will force back the catch-piece 61, which releases the rod 62 in the breast-beam, which, in turn, will be forced out by a spiral or other spring, and the shipper-handle 63 moved to ship the belt from the tight pulley D to the loose pulley D'. The rod 62 has a notch cut in it, into which the long arm of the catch-piece 61 is forced by a spring, 64, when the shipper-handle 63 is drawn in to put the loom in motion.

A stand, N, provided with a piece of rubber or other elastic material, $x$, for the lever I to strike against, is arranged back of lever I, as shown in fig. 1. By this arrangement much jarring is prevented. The rear of the slotted or grooved guide-piece H' may be supported by a stand, O. A guide-piece, $s$, may be applied to the side of the ribbed holder G, under which to pass the ends of the pieces of palm-leaf, as shown in the drawings; and this guide-piece may be made adjustable, so that it can be raised and lowered, to leave a greater or less space between it and the inner rib $b$.

It will be observed that, when the lever K is depressed, the slide-piece J' and the connection J will be depressed also, whereby lever I will be thrown forward to move the feed-arm S into the positions shown in figs. 1 and 3; and, when lever K is elevated, the motions of the same parts will be reversed.

To give the holder G a slight vibratory motion just before the finger $m$ falls to feed the material, it is provided with a notched bar, $w$, into which a spring-pawl, $t$, works. Pawl $t$ is fitted in a sheath hinged to a stud fastened in the slot M''' of the piece M'', and connected to the arm 70 by a flexible joint, 71. Pawl $t$ is forced out into the notched bar $w$ by a spiral spring. The vibratory motion of the sheath is sufficient to cause the pawl $t$ to leave the notched bar in time to let the holder G swing back to bring the pieces of palm-leaf up against the fingers of the guard or stop-piece $h'$ before the feeding of the palm-leaf takes place at such time. This motion of the holder tends to loosen and separate the pieces of material being fed.

It will be noticed that nearly all the parts connected with the holding and feeding of the material and the throwing of the feed-arm are made adjustable, whereby great accuracy of adjustment can be obtained. The form of lever M is such as to give the proper rests to the feeding-mechanism, to enable the other parts of the loom to operate properly. The front of the hinged table L rests, when down in the position shown in fig. 1, upon a shoulder or projection on the inside of the stand-piece 72, which rises up from the bed L'', so that all the parts thereon are supported in a firm manner.

Having described my improved loom for weaving palm-leaf and other material, what I claim therein as new and of my invention, and desire to secure by Letters Patent, is—

1. The hinged holder G, substantially as and for the purposes set forth.

2. The combination of the hinged fingers $c$ $c$ with the ribs $b$ $b$ $b$, substantially as and for the purposes set forth.

3. The combination of the adjustable weight G' with the bottom of the holder, for the purposes set forth.

4. The combination, with the hinged fingers $c$ $c$, of the hinged holding-piece G'', substantially as and for the purposes set forth.

5. The fingered stop or guard-piece $h'$, with the holder G, substantially as and for the purposes set forth.

6. The combination, with the stand or plate $h$, of the grooved hinged flap $i$, for supporting the guard or stop-piece $h'$.

7. The combination, with the ribbed holder G, of the guide-piece $s$, as and for the purposes set forth.

8. The combination of the feed-arm $m$ with the slide-piece $n$ and lever 26, substantially as and for the purposes set forth.

9. The combination, with lever 26, of the adjustable ears 27 27, for the purposes stated.

10. The combination, with slide-piece $n$ and table L, of the connecting-piece 21, substantially as and for the purposes set forth.

11. The combination, with the slotted slide-piece M'' and connecting-piece 21, of the double-shouldered bolts 18 18, substantially as and for the purposes set forth.

12. The combination, with the curved lever M, and the slide-piece M'', of the bent levers M' M', substantially as and for the purposes set forth.

13. The combination, with the arm 70 and notched bar $w$, of the spring-pawl $t$, substantially as and for the purposes set forth.

14. Mechanism for separating the pieces of material to be fed, constructed and combined for operation substantially as described, and as shown in fig. 7 of the accompanying drawings.

15. The combination, with a loom for weaving palm-leaf and other cloth, of a push-finger, 41, substantially as and for the purposes set forth.

16. The combination, with the stem of the push-finger 41, of the catch-piece 42, lever 44, and operating-springs 43 and 46, substantially as and for the purposes set forth.

17. The combination, with the slide $n$, of the projection or dog 47, for releasing lever 46 from the catch-piece 42, as set forth.

18. The combination, with the hinged table L, of the mechanism for separating and feeding the material, substantially as set forth.

19. The combination, with the stationary bed L'' and stand 72, of the hinged table L and catch $o$, substantially as set forth.

20. The combination and relative arrangement, with the table L, bed L'', and holder G, of the evener-knives 12 and 14, as shown and set forth.

21. The combination, with the bridge-piece 50, of the hinged dog 52 and bell-spring 53, substantially as and for the purposes set forth.

22. The combination and relative arrangement of mechanism, substantially such as is shown and described, for communicating the proper motions to the feed-arm S from lever K.

23. The combination, with a loom for weaving palm-leaf, of mechanism, substantially such as shown and described, for stopping the loom, as set forth.

GEO. W. CHANDLER.

Witnesses:
  THOS. H. DODGE,
  D. L. MILLER.